United States Patent [19]

Kang et al.

[11] Patent Number: 4,956,444
[45] Date of Patent: Sep. 11, 1990

[54] CHEMICAL SYNTHESIS OF STABLE AND ELECTROACTIVE POLYPYRROLE AND RELATED POLYHETEROCYCLIC COMPOUNDS

[75] Inventors: En-Tang Kang; Thiam C. Tan; Koon G. Neoh, all of Singapore, Singapore

[73] Assignee: National University of Singapore, Kent Ridge, Singapore

[21] Appl. No.: 36,497

[22] Filed: Apr. 9, 1987

[51] Int. Cl.$^5$ .......................... C08G 2/06; C08G 2/18
[52] U.S. Cl. .................. 528/220; 528/380; 528/392; 528/405; 528/423
[58] Field of Search ............... 528/220, 392, 405, 380, 528/423

[56] References Cited

U.S. PATENT DOCUMENTS 3,574,072  4/1971  Louvar .............................. 548/541
4,640,749  2/1987  Naarmann et al. ................. 528/392

OTHER PUBLICATIONS

"Chemical Synthesis and Characterization of Polypyrrol–Chlorine Complex", Polymer, 1988, vol. 29, K. G. Neoh, T. C. Tan, and E. T. Kang, pp. 553–558.

"Stability of Chemically Synthesized Conducting Polypyrrole–Halogen Complexes in Acidic and Basic Solutions and Organic Solvents", Polymer Communications, vol. 30, 1989, K. G. Neoh et al., pp. 48–50.

Primary Examiner—John Kight, III
Assistant Examiner—P. Hampton Hightower
Attorney, Agent, or Firm—Owen, Wickersham & Erickson

[57] ABSTRACT

A simple chemical process for the simultaneous polymerization and oxidation of pyrrole, N-substituted pyrroles, and other heterocycles having five or six member rings by halogenic or organic electron acceptors. The polypyrrole-acceptor charge transfer complexes so produced are of high purity and are stable in the atmosphere, in the presence of moisture and at elevated temperatures. The conductivities of the complexes are controllable between 30 ohm$^{-1}$ cm$^{-1}$ and 10$^{-3}$ ohm$^{-1}$ cm$^{-1}$, depending on the type of acceptor used and the process conditions.

25 Claims, No Drawings

CHEMICAL SYNTHESIS OF STABLE AND ELECTROACTIVE POLYPYRROLE AND RELATED POLYHETEROCYCLIC COMPOUNDS

This invention relates to the chemical synthesis of a new family of stable electrically conductive organic polymeric materials and devices comprising a heterocyclic polymer, in particular, polypyrrole or PPY, and various halogenic and organic electron acceptors.

BACKGROUND OF THE INVENTION

Plastics that can conduct electricity are a technological dream harbored by most research scientists and engineers. In fact, conducting polymers have only emerged in the last decade as a new class of materials with electrical and electronic uses. The synthesis, characterization, and applications of some members of this new class of materials are well known in the literature. They have been described, for example, in *Polymers in Electronics*, edited by T. Davidson, ACS Symposium Series 242, Washington (1984); in H. G. DeYoung, *High Technology*, 3(1), 65 (1983); and in *A Handbook of Conducting Polymers*, Vol. I & II, edited by T. Skotheim, Marcel Dekker, N.Y. (1985).

Some anticipated major applications for this class of materials are redox electrodes for high-energy-density rechargeable batteries, light-weight conductors, wire and cable sheathings, electromagnetic shields for computers and electronic equipment, anti-static packaging materials for sensitive electronic components, electrode materials, Schottky diodes, semiconductor junctions, photovoltaic cells, and detectors.

A number of electrically conductive or semiconductive polymeric materials are known. However, only polymers with conjugated backbone are of particular interest. The conductivities of such materials may be made to undergo a transition from an insulator or semiconductor to metal-like, via a process of chemical or electrochemical doping (oxidation and reduction), utilizing various electron acceptors and/or electron donor dopants. Three main classes of such conjugated polymers have been identified, viz. poly(acetylene) and its derivatives, poly(phenylene) and its derivatives and poly(heterocyclic) polymers and cations. Unfortunately, the electrical conductivities for most of the chemically doped conjugated polymers degrade rapidly when those polymers are exposed to ambient air. The detrimental effects of oxygen and moisture on the physical and electrical properties of these materials have so far prevented them from any practical applications.

The only stable conductive polymers that are known to have been produced so far are the heterocyclic polymers and their cations, particularly polypyrrole (PPY) and its charge transfer complexes, obtained via the process of electrochemical oxidation and polymerization in appropriate electrolytes. However, the conductive polymers prepared by such a process have usually been in the form of thin, brittle films. Furthermore, the electrochemical polymerization process is probably too expensive and inefficient for producing these conductive plastics in bulk quantity. It also involves the use of highly toxic electrolytes and solvents. Thus, an alternative simple chemical method for synthesizing and oxidating heterocyclic polymers in bulk quantities is needed.

Polypyrrole and its derivatives have been synthesized chemically in the presence of an acid or peroxide initiator. The work has been reviewed by G. P. Gardini, *Advances in Heterocyclic Chemistry*, 15, 67 (1973) The products so obtained were mainly insulating films or powder or particulates with room-temperature conductivity typically in the order of $10^{-11}$ ohm$^{-1}$ cm$^{-1}$. Besides these films are not completely stable in air, not even at room temperature. Moreover, these products are usually contaminated by the polymerization catalyst or initiator. The initially insulating and oxidative films can be doped with bromine ($Br_2$) or iodine ($I_2$) to increase their conductivities to the order of $10^{-5}$ ohm$^{-1}$ cm$^{-1}$.

More recently, somewhat more conductive polypyrrole has been synthesized in the presence of various Fe(III) oxidants, such as $Fe(ClO_4)_3$ and $FeCl_3$. However, the polymer so obtained is liable to have been contaminated by a residual amount of iron.

SUMMARY OF THE INVENTION

This disclosure reports on the successful synthesis of a new family of PPY-acceptor charge transfer complexes via the simultaneous chemical polymerization and oxidation of pyrrole by the organic and halogenic electron acceptors. More importantly, this new family of pyrrole-based conducting polymers has electrical conductivities controllable between 30 and $10^{-3}$ ohm$^{-1}$ cm$^{-1}$ and exhibits remarkable stability in the atmosphere and in the presence of moisture. In fact, some of these highly conductive complexes are polymerized in aqueous media.

A remarkable feature of the highly conductive PPY-halogenic acceptors complexes is their excellent thermal stability.

Moreover, since the initiator-catalyst for the polymerization is the acceptor dopant itself, the conductive polymers prepared by the present method are of ultra-high purity—a quality of paramount importance for applications as electrode and electronic materials and in junction devices.

The chemical preparation of polypyrrole-acceptor complexes by polymerization and oxidation in the presence of some organic and inorganic electron acceptors and discussions of some of the properties of the polymeric complexes are disclosed in Kang, E. T. et al., Solid State Commun., 60, 457 (1986); Polymer, 27, 1958-1962 (1986); J. Polym. Sci.: Polym. Chem. Ed. (in press); and J. Macrom. Sci.: Chem. (in press); wherein it is also disclosed that the polymeric complexes can exhibit semiconductivity and metal-like conductivity.

An object of the present invention is to provide a simple process for the efficient and economical synthesis of electroactive polyheterocycles.

The present chemical process offers the following advantages over the widely practiced electrochemical method of polymerization and oxidation:

(1) A larger quantity and higher yield of the polymer is obtained.

(2) The process is simpler, faster, and easier to control and handle.

(3) No expensive or toxic electrolytes are used or required.

(4) Polymerization and oxidation reactions are spontaneous and require no external input of thermal or electrical energy.

Another object of the present invention to provide a method for producing highly stable polyheterocyclic-electron acceptor complexes with semiconductivity or metal-like conductivity.

Since polymerization is induced by the electron acceptors in the process of the present invention, the need for the polymerization catalyst-initiator is thus eliminated. The polymeric complexes so produced do not therefore require exhaustive purification other than washing and rinsing. Furthermore, the polymeric complexes so produced are homogenous in microstructure and do not require further sensitization, doping or oxidation to achieve a highly conductive state.

We have found that electroactive polypyrrole and some related polyheterocyclic compounds can be chemically prepared by the simultaneous polymerization and oxidation of the heterocyclic monomers in the presence of appropriate electron acceptors. The monomers of particular interest are pyrrole and its N-substituted derivatives, but suitable monomers also include other heterocyclic compounds with five-membered rings, such as furan and thiophene, as well as heterocyclic compounds with six-membered rings, such as pyridazine.

The preferred inorganic electron acceptors are the halogens, such as iodine ($I_2$), chlorine ($Cl_2$) and bromine ($Br_2$). The preferred organic electron acceptors include 2,3-dichloro-5,6-dicyano-p-benzoquinone (DDQ), tetrachloro-o-benzoquinone (chloranil) and other benzoquinones.

By reacting the monomer directly with the electron acceptor at $-5°$ C. to $27°$ C. (i) in the bulk, or (ii) in the presence of an aprotic organic solvent medium, or (iii) in an aqueous environment, an electroactive polymeric complex is obtained. The electrical and physicochemical properties of the resulting complexes depend on the type of acceptor used and the process conditions.

DESCRIPTION OF PREFERRED EMBODIMENTS

For reactions carried out in the bulk, the preferred electron acceptor is an organic benzoquinone or the like. In this preferred process, approximately equal amounts of the organic acceptor and the monomer are mixed directly, with vigorous agitation, under an inert atmosphere and at or near room temperature.

For reactions carried out in the presence of an aprotic solvent, 2 to 6 percent by weight of electron acceptor is first dissolved in the organic solvent. The system is then saturated with an inert gas and maintained at a temperature between $-10°$ C. and room temperature. After the introduction of the monomer, 1–4 percent by weight, the system is stirred vigorously for 3–8 hours.

When the present process is carried out in aqueous media, 2–6 percent by weight of the electron acceptor may be dispersed in deionized water. 1–4 percent by weight of purified monomer is then introduced into the reaction vessel. The system is kept in the dark and at a temperature between $0°$ C. and room temperature for 24 to 72 hours.

The polymeric complexes obtained from any of the above methods are all washed and rinsed, first with various organic solvents and then with dry methanol or ethanol.

In the case where the monomer is pyrrole, a rather conductive, black complex is always obtained. The complex can vary in texture from rubbery and sponge-like to powdery or granular in nature, depending on the acceptor used and the process conditions.

The uv-visible and infrared (IR) absorption spectra of the conductive polypyrrole-acceptor complexes prepared by the chemical process of the present invention is superimposable on those of the polypyrrole cations prepared by the conventional electrochemical methods. The uv-visible absorption spectra reveal two relatively broad bands. One band centers at around 420 nm and is characteristic of polypyrrole. The other intense broad band which appears in the red and extends well into the near IR region results from the charge transfer interaction between the polymer and the acceptor. The IR absorption in all of the present electroactive polypyrrole complexes show a featureless decrease in absorption from 4000 to about 1700 $cm^{-1}$. This long absorption tail has been assigned to be the tail of the absorption peak located in the near-IR for oxidized polypyrrole and has been claimed to be directly related to the electrical conductivity of the material. Absorption bands are also observed at about 1540, 1300, 1170, 1030 and 900 $cm^{-1}$. The band at 1540 $cm^{-1}$ is the highest energy fundamental vibration of the pyrrole ring. The band at 1040 $cm^{-1}$ belongs to the $C\beta$—H in plane deformation vibration, and the bands at and below 900 $cm^{-1}$ are assigned to the $C\beta$—H out-of-plane vibration. The appearance of these $C\beta$—H peaks indicates that the $\beta$-carbons are not the principal carbons through which the polymerization takes place.

We wish to emphasize that all the polypyrrole-electron acceptor complexes synthesized by the present process of simultaneous polymerization and oxidation are stable in the atmosphere, for example, exposing the polypyrrole-$I_2$ and —$Br_2$ complexes to the atmosphere at room temperature ($25°$–$30°$ C., relative humidity $>70\%$) for months did not result in any appreciable deterioration in the physicochemical properties and the electrical conductivities of the complexes. Our results also indicate that the conducting polyheterocyclic compounds with five-membered rings appear to be somewhat more stable than the polyheterocyclic compounds with six-membered rings.

The thermal stability of the various polymeric complexes synthesized using the process of this invention is best demonstrated in thermogravimetric analysis (TGA) at elevated temperatures. None of these polymeric complexes suffered any weight loss when heated to a temperature of $100°$ C. or higher. In fact, for the polypyrrole-iodine complexes, decomposition started only at or above the boiling point of iodine ($184°$ C.). The other polyheterocyclic complexes, such as polypyrrole-organic acceptor complexes, polypyrrole-$Br_2$ complexes and poly-pyridazine-$I_2$ complexes etc. are only slightly less stable than the polypyrrole-$I_2$ complexes at elevated temperatures.

EXAMPLES

The following specific examples are provided to illustrate this invention and the manner in which it may be carried out. It will be understood, however, that the specific details given in the examples have been chosen for purpose of illustration and are not to be construed as a limitation on the invention. In the examples, unless otherwise stated, all yields are based on the amount of monomeric units present in the final complexes.

EXAMPLE 1

In a preferred process, three percent by weight of pulverized iodine ($I_2$) was dispersed in deionized water in a glass reaction vessel. Two percent by weight of monomeric pyrrole was introduced on the surface of the water. The reaction vessel was closed and kept in the dark at $4°$ C. and under atmospheric pressure for about 60 hours. A thick, black spongy polymer layer was obtained at the bottom of the vessel. The black material was extracted with copious amounts of cold (4° C.) acetonitrile, carbon tetrachloride and absolute ethanol, in that order. It was then dried in dynamic vacuum. The yield was about 40%. The polypyrrole-$I_2$ charge transfer complex so produced was sponge-like, somewhat rubbery in texture and had a conductivity of about 30 ohm$^{-1}$ cm$^{-1}$. The material was completely stable in the atmosphere.

EXAMPLE 2

Three percent by weight of iodine was dissolved in an aprotic solvent, preferably acetonitrile, in a glass reaction vessel. The system was saturated with nitrogen. Two percent by weight of monomeric pyrrole was introduced into the reaction mixture with vigorous stirring. The vessel was closed and stirred continuously for about 6–8 hours. A black precipitate was obtained in the reaction mixture. The black precipitate was removed by filtration and subjected to the washing sequence described in Example 1. The yield was about 30%. The polypyrrole-$I_2$ charge transfer complex so produced is granular in nature and has an electrical conductivity in the order of $10^0$ ohm$^{-1}$ cm$^{-1}$.

EXAMPLE 3

Three percent by weight of bromine ($Br_2$) was dissolved in an organic solvent, preferably carbon tetrachloride ($CCl_4$), in a glass reaction vessel. An equal volume (as that of $CCl_4$) of deionized water was introduced into the vessel to form a two-phase system. An equal weight. (as that of $Br_2$) of monomeric pyrrole was then introduced on to the surface of the water. The reaction vessel was closed and kept in the dark for about 72 hours. A thick black polymer cake was obtained at the interface between the water and the $CCl_4$ layer. The black material was removed from the reaction mixture and subjected to the washing procedure described in Example 1. The yield was about 50%. The polypyrrole-$Br_2$ charge transfer complex so produced is granular in nature and has an electrical conductivity of about 0.5 ohm$^{-1}$ cm$^{-1}$.

EXAMPLE 4

Three percent by weight of bromine was dissolved in an aprotic solvent, preferably acetonitrile, in a glass reaction vessel. The system was saturated with nitrogen. Two percent by weight of monomeric pyrrole was introduced into the reaction mixture with vigorous stirring. The vessel was closed, kept at 0° C., and stirred continuously for about 6 hours. A black precipitate was obtained in the reaction mixture. The black precipitate was removed by filtration and subjected to the washing sequence described in Example 1. The yield was about 55–60%. The polypyrrole-$Br_2$ charge transfer complex so produced is granular in nature and has an electrical conductivity of about 25 ohm$^{-1}$ cm$^{-1}$.

EXAMPLE 5

The synthesis procedure is the same as in Example 4, except a N-substituted pyrrole, N-methyl pyrrole, is used as monomer. The yield is about 55–60%. The poly(N-methyl pyrrole)-$Br_2$ complex so produced is granular in nature and dark brown in color. The electrical conductivity of the complex is in the order of $10^0$–$10^1$ ohm$^{-1}$ cm$^{-1}$.

The chemical compositions and electrical properties of the various polypyrrole complexes prepared according to the procedures described in Examples 1 to 5 are summarized in Table 1.

TABLE 1
CHEMICAL COMPOSITION AND ELECTRICAL CONDUCTIVITY OF POLYPYRROLE-HALOGEN COMPLEXES PREPARED BY THE PROCESS OF THIS INVENTION

| EXAMPLE | SYSTEM | POLYMERIZATION MEDIUM | CHEMICAL COMPOSITION (NORMALIZED) | ELECTRICAL CONDUCTIVITY (ohm$^{-1}$ cm$^{-1}$), 27° C. |
|---|---|---|---|---|
| 1 | Polypyrrole-$I_2$ | $H_2O$, 4° C. | $C_{4.1}H_{2.6}N_{1.0}O_{1.0}(I_2)_{0.25}$ | 30 |
| 2 | Polypyrrole-$I_2$ | $CH_3CN$, 27° C. | $C_{4.0}H_{3.0}N_{0.93}O_{0.69}(I_2)_{0.23}$ | 1 |
| 3 | Polypyrrole-$Br_2$ | $H_2O/CCl_4$, 27° C. | $C_{4.3}H_{3.1}N_{1.0}O_{1.2}(Br_2)_{0.44}$ | 0.5 |
| 4 | Polypyrrole-$Br_2$ | $CH_3CN$, 0° C. | $C_{4.0}H_{2.7}N_{1.0}O_{0.63}(Br_2)_{0.24}$ | 25 |
| 5 | Poly(N-methyl-pyrrole)-$Br_2$ | $Ch_3CN$, 0° C. | $C_{4.0}H_{2.1}N_{1.0}(CH_3)_{1.0}O_{0.50}(Br_2)_{0.22}$ | 0.4 |

EXAMPLE 6

This example involves the polymerization and doping of pyrrole by an organic electron acceptor. 50% by weight of recrystallized 2,3-dichloro-5,6-dicyano-p-benzoquinone (DDQ) was dispersed uniformly and directly into monomeric pyrrole, with vigorous agitation and under a nitrogen atmosphere, in a glass reaction vessel. The reaction mixture turned black instantaneously, with heat generation and precipitation. The reaction mixture was allowed to stand for at least four hours. The black precipitate was subjected to the washing procedure described in Example 1. The yield was about 30–35%. The PPY-DDQ charge transfer complex so produced is granular in nature and has an electrical conductivity of about $10^{-1}$ ohm$^{-1}$ cm$^{-1}$.

EXAMPLE 7

The synthesis procedure is the same as in Example 6, except tetrachloro-o-benzoquinone (chloranil) is used as the electron acceptor. The yield is about 30–35%. The PPY-chloranil charge transfer complex so produced is granular in nature and has an electrical conductivity of the order of $10^{-3}$ ohm$^{-1}$ cm$^{-1}$.

The chemical compositions and electrical conductivities of the polypyrrole-organic acceptor complexes prepared according to procedures described in Examples 6 and 7 are summarized in Table 2.

TABLE 2
CHEMICAL COMPOSITION AND ELECTRICAL CONDUCTIVITY OF POLYPYRROLE-ORGANIC ACCEPTOR COMPLEXES PREPARED BY THE PROCESS OF THIS INVENTION

| EXAMPLE | SYSTEM | POLYMERIZATION MEDIUM | CHEMICAL COMPOSITION (NORMALIZED) | ELECTRICAL CONDUCTIVITY (ohm$^{-1}$ cm$^{-1}$), 27° C. |
|---|---|---|---|---|
| 6 | Polypyrrole-DDQ | Bulk, 27° C. | $C_{4.0}H_{3.3}N_{0.90}(C_8N_2O_2Cl_2)_{0.37}O_{1.0}$ | $10^{-1}$ |

TABLE 2-continued

CHEMICAL COMPOSITION AND ELECTRICAL CONDUCTIVITY OF POLYPYRROLE-ORGANIC ACCEPTOR COMPLEXES PREPARED BY THE PROCESS OF THIS INVENTION

| EXAMPLE | SYSTEM | POLYMERIZATION MEDIUM | CHEMICAL COMPOSITION (NORMALIZED) | ELECTRICAL CONDUCTIVITY (ohm$^{-1}$ cm$^{-1}$), 27° C. |
|---|---|---|---|---|
| 7 | Polypyrrole-chloranil | Bulk, 27° C. | $C_{4.0}H_{2.9}N_{0.87}(C_6O_2Cl_4)_{0.25}O_{1.0}$ | $10^{-3}$ |

EXAMPLES 8–10

The synthesis procedures described in the examples above can be conveniently extended to the synthesis of other electroactive polyheterocycles consisting of five or six membered rings. Thus, by replacing the monomeric pyrrole with an equal amount of furan and following the procedure described in Example 2, thin films of polyfuran-$I_2$ complex is obtained on the reactor wall. Similarly, thiophene reacts with $I_2$ directly to form an insoluble powdery complex when the reaction is carried out under the conditions described in Example 6. Pyridazine polymerizes in the presence of $I_2$ to give a rather conductive black complex of granular in nature when the reaction is carried out according to the process described in Example 2.

The chemical compositions and electrical properties of the various polyheterocycle-acceptor complexes described in Examples 8–10 are summarized in Table 3.

TABLE 3

CHEMICAL COMPOSITION AND ELECTRICAL CONDUCTIVITY OF HETEROCYCLIC-ACCEPTOR COMPLEXES PREPARED BY THE PROCESS OF THIS INVENTION

| EXAMPLE | SYSTEM | POLYMERIZATION MEDIUM | CHEMICAL COMPOSITION (NORMALIZED) | ELECTRICAL CONDUCTIVITY (ohm$^{-1}$ cm$^{-1}$), 27° C. |
|---|---|---|---|---|
| 8 | Polyfuran-$I_2$ | $CH_3CN$, 27° C. | $C_{4.0}H_{2.9}O_{1.1}(I_2)_{0.02}$ | $10^{-11}$ |
| 9 | Polythiophene-$I_2$ | Bulk, 27° C. | $C_{4.0}H_{4.0}S_{1.0}(I_2)_{0.02}$ | $10^{-10}$ |
| 10 | Polypyridazine-$I_2$ | $CH_3CN$, 27° C. | $C_{4.0}H_{2.9}N_{2.0}(I_2)_{0.69}$ | 3 |

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An electroactive polymer comprising the polymerized purely chemical reaction product of a five or six membered, heterocyclic ring monomer with an electron acceptor.

2. The polymer of claim 1 wherein the electron acceptor is iodine, bromine, or chlorine.

3. The polymer of claim 1 wherein the electron acceptor is organic.

4. The polymer of claim 1 wherein said monomer is selected from the group consisting of pyrrole and its N-substituted derivatives.

5. An electroactive polymer consisting of the polymerized reaction product of pyrrole monomer with a halogen.

6. The polymer of claim 5 wherein the halogen is $I_2$.

7. The polymer of claim 5 wherein the halogen is $Br_2$.

8. The polymer of claim 5 wherein the halogen is $Cl_2$.

9. An electroactive polymer consisting of the polymerized purely chemical reaction product of a monomer selected from the group consisting of pyrrole, an N-substituted pyrrole derivative, furan, thiophene, and pyridazine with an electron acceptor selected from the group consisting of iodine, bromine, DDQ, and chloranil.

10. The polymer of claim 9 wherein the monomer is pyrrole.

11. The polymer of claim 9 wherein the monomer is N-methyl pyrrole and the electron acceptor is bromine.

12. The polymer of claim 9 wherein the monomer is furan and the electron acceptor is iodine.

13. The polymer of claim 9 wherein the monomer is thiophene and the electron acceptor is iodine.

14. The polymer of claim 9 wherein the monomer is pyridazine and the electron acceptor is iodine.

15. A process for making an electroactive polymer comprising chemically reacting and polymerizing a heterocyclic five or six member ring monomer with an electron acceptor which also serves as the polymerization catalyst and initiator.

16. The process of claim 15 wherein the monomer is pyrrole.

17. The process of claim 16 wherein the reaction is carried out in an inert atmosphere at approximately room temperature.

18. The process of claim 15 wherein the reaction is carried out in an aprotic organic solvent medium.

19. The process of claim 18 wherein the electron acceptor is first dissolved in the aprotic organic. solvent, and then in an inert atmosphere and at a temperature between about $-10°$ C. and $+30°$ C., the monomer is introduced into the solvent and is vigorously stirred for about three to eight hours.

20. The process of claim 19 wherein the electron acceptor is introduced at 2 to 6% by weight, the solvent and the monomer at 1–4% by weight.

21. The process of claim 18 wherein the acceptor is $I_2$ or $Br_2$ and the monomer is selected from the group consisting of pyrrole, N-methyl pyrrole, furan, thiophene, and pyridazine.

22. The process of claim 21 wherein the solvent is $CH_3CN$.

23. The process of claim 15 wherein 2–6% by weight of electron acceptor is dispersed in deionized water, 1–4% of monomer introduced, and the system is then kept in the dark for about 24–72 hours at a temperature between about 0° C. and about 30° C.

24. The process of claim 23 wherein the monomer is a pyrrole and the acceptor $I_2$ or $Br_2$.

25. The process of claim 23 wherein the deionized water is mixed with an equal amount of $CCl_4$.

* * * * *